(12) United States Patent
Lucas, III

(10) Patent No.: US 9,422,765 B2
(45) Date of Patent: Aug. 23, 2016

(54) METHOD FOR MAKING FLUSH ARCHITECTURAL DOORS USING POST-CONSUMER MATERIALS

(71) Applicant: William Henry Lucas, III, Everett, WA (US)

(72) Inventor: William Henry Lucas, III, Everett, WA (US)

(73) Assignee: Recor International, Inc., Everett, WA (US)

( * ) Notice: Subject to any disclaimer, the term of this patent is extended or adjusted under 35 U.S.C. 154(b) by 75 days.

(21) Appl. No.: 14/298,686

(22) Filed: Jun. 6, 2014

(65) Prior Publication Data

US 2014/0283456 A1    Sep. 25, 2014

Related U.S. Application Data

(62) Division of application No. 13/097,996, filed on Apr. 29, 2011.

(51) Int. Cl.
*B23P 6/00* (2006.01)
*E06B 3/82* (2006.01)

(52) U.S. Cl.
CPC . *E06B 3/825* (2013.01); *B23P 6/00* (2013.01); *E06B 3/82* (2013.01); *Y10T 29/4973* (2015.01); *Y10T 29/49726* (2015.01); *Y10T 29/49732* (2015.01)

(58) Field of Classification Search
CPC ............... B23P 6/00; Y10T 29/49723; Y10T 29/49721; Y10T 29/49732; Y10T 29/4973
See application file for complete search history.

(56) References Cited

U.S. PATENT DOCUMENTS

| | | |
|---|---|---|
| 1,919,702 A | 7/1933 | Murphy |
| 2,042,246 A | 5/1936 | Bailey |
| 2,620,521 A | 12/1952 | Fleet |
| 2,703,443 A | 3/1955 | Lee |
| 3,165,792 A | 1/1965 | Pick |
| 3,168,763 A | 2/1965 | Gilbert |
| 3,196,494 A | 7/1965 | Hartman et al. |
| 3,225,505 A | 12/1965 | Lytz |
| 3,254,592 A | 6/1966 | Chase |
| 3,761,336 A | 9/1973 | Quinif |
| 3,994,110 A | 11/1976 | Ropella |
| 4,015,393 A | 4/1977 | Warwick |
| 4,140,828 A | 2/1979 | Copping |
| 4,146,662 A * | 3/1979 | Eggers .................... B32B 21/06 156/220 |
| 4,303,707 A | 12/1981 | Prior |
| 4,364,987 A | 12/1982 | Goodwin |
| 4,489,121 A | 12/1984 | Luckanuck |
| 4,610,119 A | 9/1986 | Bench, Sr. |
| 5,305,577 A | 4/1994 | Richards et al. |
| 5,603,194 A | 2/1997 | Fridlyand et al. |
| 5,816,017 A | 10/1998 | Hunt et al. |
| 6,389,768 B1 * | 5/2002 | Gagne ....................... E06B 3/88 52/309.9 |

(Continued)

*Primary Examiner* — Jermie Cozart
(74) *Attorney, Agent, or Firm* — Mark P. Walters; Lowe Graham Jones PLLC

(57) ABSTRACT

A method for forming a flush architectural wooden door using at least one post-consumer material includes collecting a previously-used door from a collection site. The previously-used door includes a core having a first major surface, a second major surface opposite to the first major surface, and a perimeter extending around the opposing major surfaces. The core is extracted from the previously-used door. Rails and styles are applied to a perimeter of the extracted core. A first skin is applied over the first major surface of the extracted core and applied rails and styles. The extracted core, rails, styles, and first skin have a collective weight. The extracted core forms over half of that collective weight.

7 Claims, 3 Drawing Sheets

(56) References Cited

U.S. PATENT DOCUMENTS

| | | |
|---|---|---|
| 6,434,899 B1 | 8/2002 | Fortin et al. |
| 6,478,910 B1 | 11/2002 | Jung |
| 6,497,938 B1 | 12/2002 | Hill |
| 6,643,991 B1 | 11/2003 | Moyes |
| 6,886,306 B2 | 5/2005 | Churchill et al. |
| 7,832,166 B2 | 11/2010 | Daniels |
| 8,209,866 B2 | 7/2012 | Daniels |
| 2003/0150189 A1 | 8/2003 | Ou et al. |
| 2004/0003559 A1 | 1/2004 | Minke et al. |
| 2004/0172914 A1 | 9/2004 | Lancia |
| 2004/0226245 A1 | 11/2004 | Clark et al. |
| 2006/0032167 A1 | 2/2006 | Cecilio et al. |
| 2006/0096240 A1 | 5/2006 | Fortin |
| 2008/0016820 A1 | 1/2008 | Robbins, Sr. et al. |
| 2008/0168744 A1 | 7/2008 | Petersen et al. |
| 2009/0031669 A1 | 2/2009 | Stanton |
| 2009/0305070 A1 | 12/2009 | Belluz et al. |
| 2010/0089001 A1 | 4/2010 | West et al. |
| 2010/0212258 A1 | 8/2010 | Wysock et al. |
| 2011/0000167 A1 | 1/2011 | Dimke |
| 2011/0000402 A1 | 1/2011 | Grasso, Jr. |
| 2011/0047183 A1 | 2/2011 | Ford et al. |

\* cited by examiner

METHOD FOR MAKING FLUSH ARCHITECTURAL DOORS USING POST-CONSUMER MATERIALS

PRIORITY CLAIM

This application is a divisional of U.S. application Ser. No. 13/097,996 filed Apr. 29, 2011, the content of which is herein incorporated by reference.

FIELD OF THE INVENTION

The present invention is directed to the area of door fabrication and methods of making the doors. The present invention is also directed to flush architectural doors formed using post-consumer materials, as well as methods of making the flush architectural doors.

BACKGROUND OF THE INVENTION

There is a general desire to reduce the costs associated with construction projects (e.g., commercial, residential, industrial, or the like). These costs may include, for example, money, time, materials, or the environmental impact associated with the construction projects. One way to reduce one or more of these costs is to reuse materials, whenever possible. For example, prior to demolition of a preexisting structure, at least some hardware and/or materials may be removed from the structure and resold or reused (either in whole or in part) in another structure, either at the site of the demolition or at another location.

Flush architectural doors are commonplace in many buildings (e.g., commercial, residential, industrial, or the like). When new buildings are built, new flush architectural doors are commonly used within the new buildings. Flush architectural doors are commonly formed using wood or wood-based products. Currently, 95%-100% of commercial-grade flush architectural wooden doors are produced by harvesting of living wood. Unfortunately, when many buildings are demolished, flush architectural wooden doors from within the buildings are destroyed during the demolition process.

BRIEF DESCRIPTION OF THE DRAWINGS

Preferred and alternative examples of the present invention are described in detail below with reference to the following drawings:

Non-limiting and non-exhaustive embodiments of the present invention are described with reference to the following drawings. In the drawings, like reference numerals refer to like parts throughout the various figures unless otherwise specified.

Figure 1A:
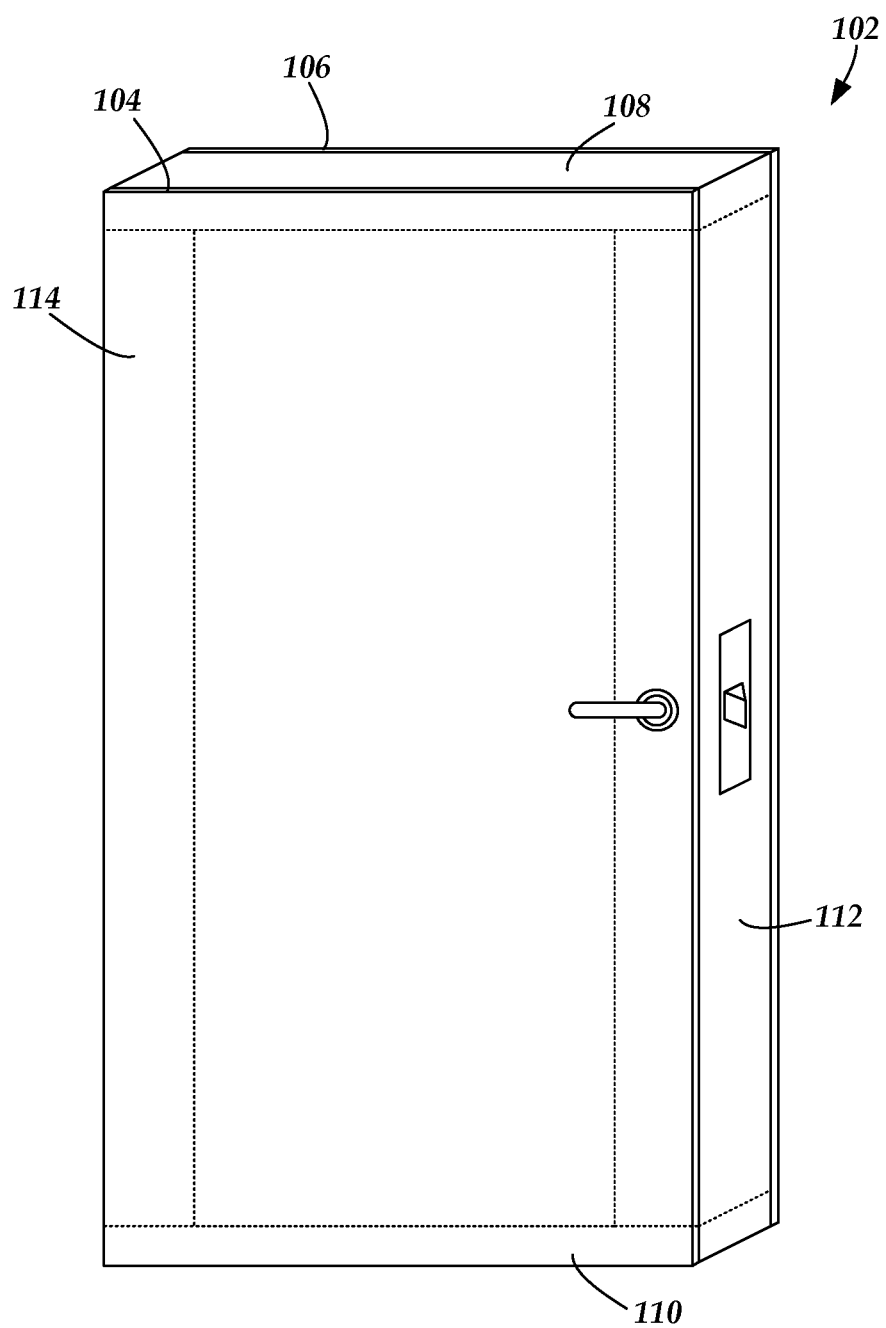
Figure 1B:
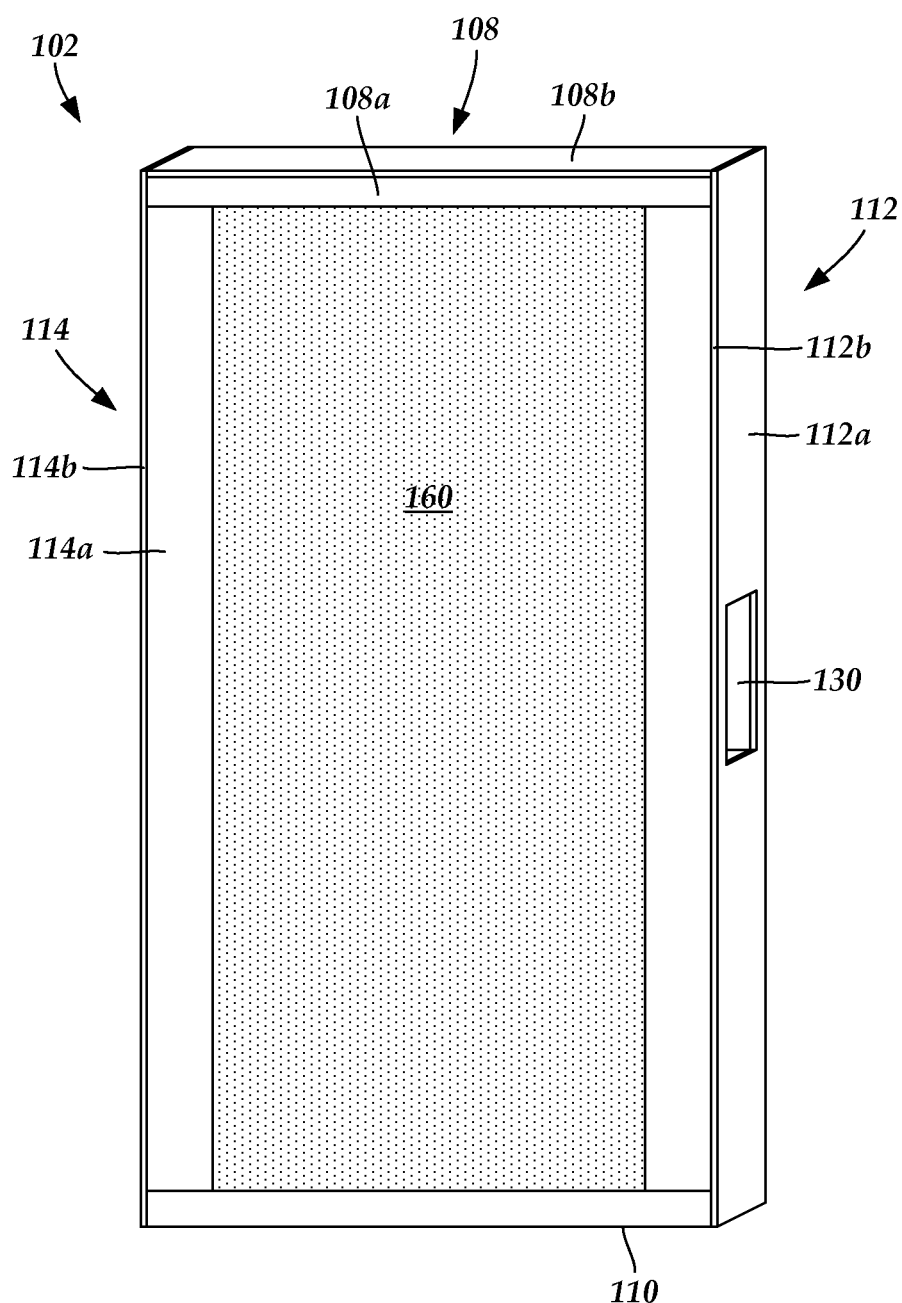
Figure 2:
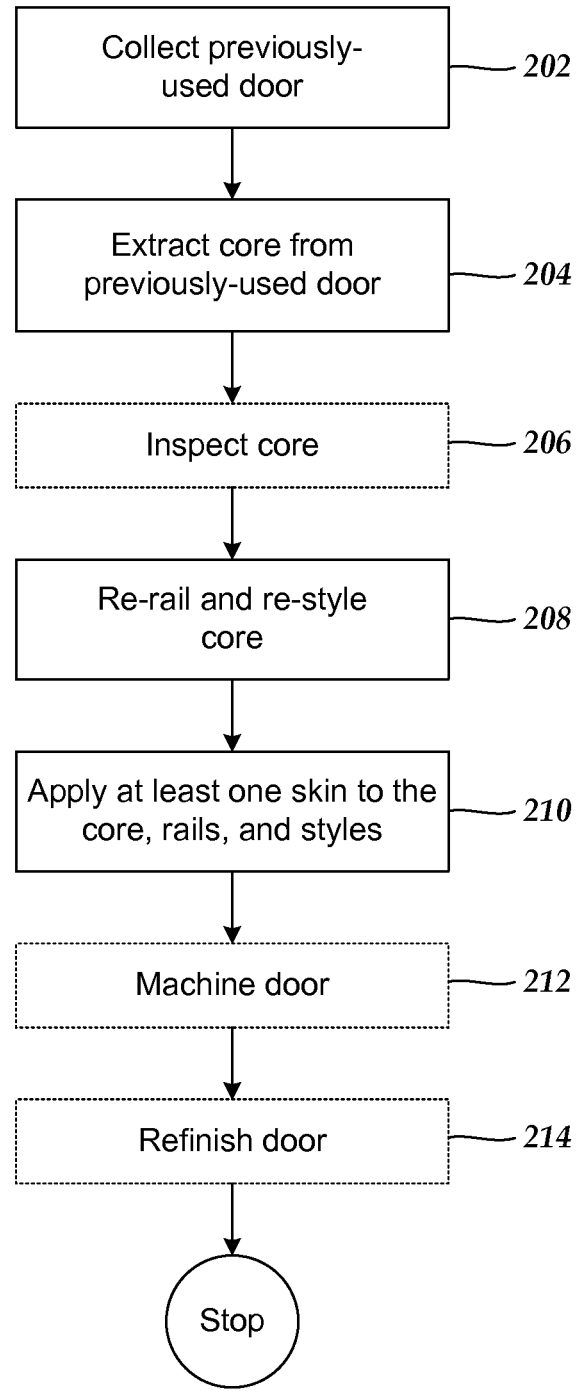

For a better understanding of the present invention, reference will be made to the following Detailed Description, which is to be read in association with the accompanying drawings, wherein:

FIG. 1A is a schematic perspective view of one embodiment of a door formed, in part, by disposing rails, styles, and at least one skin over a core formed from post-consumer materials, according to the invention;

FIG. 1B is a schematic perspective view of one embodiment of skins removed from the door of FIG. 1A, thereby exposing inner portions of the door, the inner portions including rails and styles surrounding a core formed from post-consumer materials, according to the invention; and FIG. 2 is a flow chart illustrating one embodiment of a method for manufacturing the door of FIG. 1A using a core formed from post-consumer materials, according to the invention.

DETAILED DESCRIPTION OF THE PREFERRED EMBODIMENT

The present invention is directed to the area of door fabrication and methods of making the doors. The present invention is also directed to flush architectural doors formed using post-consumer materials, as well as methods of making the flush architectural doors.

At least some flush architectural wooden doors ("doors") are formed from skins styles, and rails disposed over a core. Skins, styles, and rails can be formed from any suitable materials including, for example, wood, wood-based products, gypsum, or the like or combinations thereof. Cores can be formed from any suitable material including, for example, woodchips, sawdust, wood shavings, particle board, plywood, resin (or one or more other suitable binding materials), stud grade lumber, structural lumber, laminated strand lumber ("LSL"), gypsum, fiberglass, agrifiber, or the like or combinations thereof.

As herein described, a system and method for making doors includes using post-consumer (i.e., recycled) materials. The post-consumer materials include cores from previously-used doors (e.g., doors formerly used in commercial, residential, or industrial settings, or the like or combinations thereof). It may be advantageous to form doors that include cores from previously-used doors. Doors formed from recycled cores may be more environmentally friendly than other doors because the doors formed from recycled materials do not involve harvesting new lumber to form the cores. In addition to reducing the amount of new wood or wood-based materials needed to form a new door, using recycled cores may additionally reduce the amount of post-construction wood debris discarded from construction sites (or demolition sites). Moreover, using doors formed from recycled cores in a construction project may enable credits (or points, or the like) to be earned under one or more environmental-based accreditation systems, such as the Leadership in Energy and Environmental Design ("LEED") certification system.

FIG. 1A is a schematic perspective view of one embodiment of a door 102 formed using post-consumer materials. The door 102 includes a top rail 108, an opposing bottom rail 110, a first style 112, and an opposing second style 114. A first skin 104 and an opposing second skin 106 are disposed over the rails 108, 110 and the styles 112, 114.

FIG. 1B is a schematic perspective view of one embodiment of the door 102 with the first skin 104 and the second skin 106 removed to expose inner portions of the door 102. The exposed inner portions of the door 102 include a core 160 disposed between the rails 108, 110 and the styles 112, 114. The core 160 is formed from previously-used (i.e., recycled) materials. Optionally, one or more of the styles 112, 114 may include one or more mortises 130 for receiving hardware (e.g., mounting hardware for a latch, a knob, a lock, hinges, or the like).

In at least some cases, the core 160 may be coupled to one or more of the rails 108, 110 or the styles 112, 114 using adhesive, mortise and tenon joints, or the like or combinations thereof. The skins 104, 106 can be coupled to the recycled core 160 and one or more of the rails 108, 110 or the styles 112, 114 in any suitable manner including, for example, one or more adhesives, or the like.

The rails 108, 110 and the styles 112, 114 can each be any suitable thickness. In at least some embodiments the rails 108, 110 have thicknesses of no less than one-and-a-half inches. In at least some embodiments the rails 108, 110 have thicknesses of no more than and eight inches. In at least some embodiments the styles 112, 114 have thicknesses of no greater than two-and-a-half inches. The skins 104, 106 can each be any suitable thickness. In at least some embodiments the skins 104, 106 have thicknesses of no greater than a half inch. In at least some embodiments, the skins 104, 106 have thicknesses of approximately one-sixteenth of an inch.

In some cases, one or more of the rails 108, 110, the styles 112, 114, and the skins 104, 106 may include one or more layers of materials, such as a substrate and an outer edge. For example, the rail 108 may include a substrate 108a (e.g., medium-density or high-density fiberboard, or the like) and an outer edge 108b (e.g., hardwood, softwood, or the like). Similarly, one or more of the styles 112, 114 may include a substrate 112a, 114a, respectively, and an outer edge 112a, 112b, respectfully. The skins 104, 106 may include substrates (e.g., medium-density fiberboard, or the like) and outer edges.

The edges 108b, 112b, and 114b can be any suitable thickness. In at least some embodiments the edges 108b, 112b, and 114b have thicknesses that are no less than three-eighths of an inch. In at least some embodiments, the edges 108b, 112b, and 114b have thicknesses that are no greater than one-and-one-quarter inches.

In at least some cases, one or more portions of the door 102 can be omitted. For example, in at least some embodiments the door 102 may not include one or more substrates (e.g., substrate 108a of the rail 108, or the like). In which case, the outer edge 108b can be disposed directly against the core 160.

The recycled core 160 may form the majority of the weight of the door 102 (excluding any post-manufacturing hardware, such as knobs, latches, locks, strike plates, fasteners, or the like, that may be subsequently mounted onto the door 102). In some cases, the recycled core 160 may form a majority of the weight of the door 102. For example, the recycled core 160 may form at least 51%, 55%, 60%, 65%, 70%, 75%, 80%, 85%, 90%, 95%, or more of the weight of the door 102.

Forming the door 102 from post-consumer materials may involve one or more of collecting a previously-used door, extracting a core from the previously-used door, and processing the core to form the new door 102. In some cases, the core may be inspected one or more times to ensure that the core is satisfactory for re-use. Processing the core to form the new door 102 may include re-applying all, or a portion, of one or more of the rails 108, 110 or the styles 112, 114 and re-skinning at least one side of the rails 108, 110, styles 112, 114 and extracted core 160. Optionally, processing the core to form the new door 102 may also include refinishing the new door 102.

Previously-used doors can be collected in any suitable manner. For example, previously-used doors can be gathered from a collection site. The collection site can be any suitable location including, for example, a construction project, a demolition location, a previously-used-door drop-off location, or other suitable location.

Gathered previously-used doors can be transported to an extraction location where the cores of the previously-used doors are extracted. In some cases, the collection site and the extraction location are the same location. Extracting the core may include one or more of: removing any skins disposed over the core, and removing all, or a portion of each of the rails and the styles disposed around the core. The skins can be removed from the core in any suitable manner, including using a planer, an abrasive sander, or the like. The rails and the styles (or portions thereof) can be removed in any suitable manner including, for example, ripping the rails and styles from the core. In some cases, extracting the core may include making one or more preliminary cuts through a portion of the door to determine the thicknesses of one or more of the skins, rails, or styles.

The cores may be inspected one or more times, including before, during, or after extraction. In some cases, the inspection may occur at the collection site. In other cases, the inspection may occur at the extraction site, or at some other suitable location. Inspection may include recording information about the door and/or the core. The recorded information may include, for example, one or more door dimensions, observable door features (e.g., cutouts, or the like), fire ratings, general physical conditions (e.g., integrity, moisture, density, warpage, defects, damage, or the like), core type, style or rail configuration, skin application, existence of potentially-flammable or toxic materials, or the like or combinations thereof.

Once the cores are extracted, the cores can be re-styled, re-railed, and re-skinned. In some cases, the doors 102 may additionally be machined, for example, to facilitate installment of new hardware. In some cases, the doors 102 may additionally be refinished. Refinishing the doors 102 may include at least one of staining, painting, varnishing, or the like to one or more portions of the doors 102. Refinishing the doors 102 may additionally include applying one or more protective coatings, sealants, or adhesives to one or more portions of the doors 102. In at least some embodiments, refinishing is performed using one or more ultraviolet-light-curing materials. When adhesives are used (e.g., during re-styling, re-railing, re-skinning, refinishing, or the like), the adhesives can, optionally, be No Added Urea Formaldehyde ("NAUF") compounds. It may be advantageous to use NAUF compounds in order to reduce, or even eliminate, off gassing. Using NAUF compounds may provide additional credit for a construction project seeking a desired accreditation, such as a LEED accreditation. In some cases, one or more portions of the fabrication of the doors 102 may be performed by one or more licensed door manufacturers.

Currently, one or more agencies implement tracking systems that trace timber from designated locations along a supply chain. For example, the Forest Stewardship Council ("FSC") traces products from certified forests throughout the supply chain to ensure that any claims on the origin of the product are credible and verifiable. The FSC tracking system includes a voluntary chain-of-custody certification that enables manufacturers and traders to demonstrate that timber comes from a forest that is responsibly managed in accordance with specific criteria. In some cases, a valid chain-of-custody certification may be necessary for receiving approval for using wood products in a particular project.

In some cases, the door 102 with the recycled core 160 may include chain-of-custody information that validates the origin of the core 160 as being a post-consumer product. The chain-of-custody information may include one or more of the date or location of collection of the core. The chain-of-custody information can be recorded and attached (e.g., stamped, written, etched, stapled, implanted via a chip, or the like) to a core (or to some other portion of the door 102 or to some other portion of the rail of the door) subsequent to extraction. In at least some cases, the door 102 may be useable on construction jobs that would otherwise be limited to doors having FSC chain-of-custody certification. In at least some embodiments, the chain-of-custody information can be used to create a chain-of-custody certificate.

The chain-of-custody information may additionally include other relevant information including, for example, the type of core (e.g., particle core, strand core, mineral core, stave core, or the like), the dimensions of the core, a physical description of the door from which the core was extracted, details regarding the age or origination of the door from which the core was extracted, the name or other relevant identification information of the collecting entity, the general condition of the door from which the core was extracted, or the like.

In some instances, the extracted core may be certified by one or more certifying bodies including, for example, the Architectural Woodwork Institute ("AWP"), the Window & Door Manufacturers Association ("WDMA"), American National Standards Institute ("ANSI") or the like or combinations thereof, prior to being re-railed, re-styled, and re-skinned. In some cases, the certification process may be very similar to a certification process performed on a new core.

FIG. 2 is a flow chart illustrating a method for forming the door 102 using at least some post-consumer materials. In step 202, a previously-used door is collected. In step 204, a core is extracted from the previously-used door. In optional step 206, the core is inspected. In step 208, the core is re-railed and re-styled. In step 210, at least one skin is disposed over the core, rails, and styles. Optionally, in step 212 the door is machined. Optionally, in step 214 the door is refinished.

The above specification, examples and data provide a description of the manufacture and use of the composition of the invention. Since many embodiments of the invention can be made without departing from the spirit and scope of the invention, the invention also resides in the claims hereinafter appended.

The embodiments of the invention in which an exclusive property or privilege is claimed are defined as follows:

1. A method for forming a flush architectural wooden door using at least one post-consumer material, the method comprising:
    collecting a previously-used door from a collection site, the previously-used door comprising a core having a first major surface, a second major surface opposite to the first major surface, and a perimeter around the opposing major surfaces;
    extracting the core from the previously-used door;
    applying rails and styles to the perimeter of the extracted core;
    applying a first skin over the first major surface of the extracted core and applied rails and styles;
    wherein the extracted core, the rails, the styles, and the first skin have a collective weight, and wherein the extracted core forms over half of that collective weight;
    establishing a chain of custody for the new flush architectural wooden door with the extracted core;
    wherein establishing the chain of custody for the new flush architectural wooden door with the extracted core comprises recording chain-of-custody information;
    wherein recording chain-of-custody information comprises recording the location of the collection site from where the previously-used door was collected; and
    wherein establishing the chain of custody for the new flush architectural wooden door with the extracted core comprises stamping recorded chain-of-custody information onto the new flush architectural wooden door.

2. The method of claim 1, further comprising inspecting the extracted core for at least one of physical integrity, moisture, warpage, defects, damage, cutouts, or density prior to applying rails and styles to the perimeter of the extracted core.

3. The method of claim 1, further comprising at least one of machining or refinishing the flush new architectural wooden door.

4. The method of claim 1, wherein collecting the previously-used door from the collection site comprises collecting the previously-used door from one of a construction site or a demolition site.

5. The method of claim 1, wherein extracting the core from the previously-used door comprises using a planer or an abrasive sander to remove at least one skin disposed over the core of the previously-used door.

6. The method of claim 1, wherein extracting the core from the previously-used door comprises removing at least a portion of at least one style from the core of the previously-used door.

7. The method of claim 1, further comprising applying a second skin over the second major surface of the core and applied rails and styles.

\* \* \* \* \*